March 15, 1960
H. H. ADELAAR
2,928,939
AUTOMATIC STARTING CIRCUIT FOR ELECTRICAL PULSE DISTRIBUTORS
Filed July 28, 1958
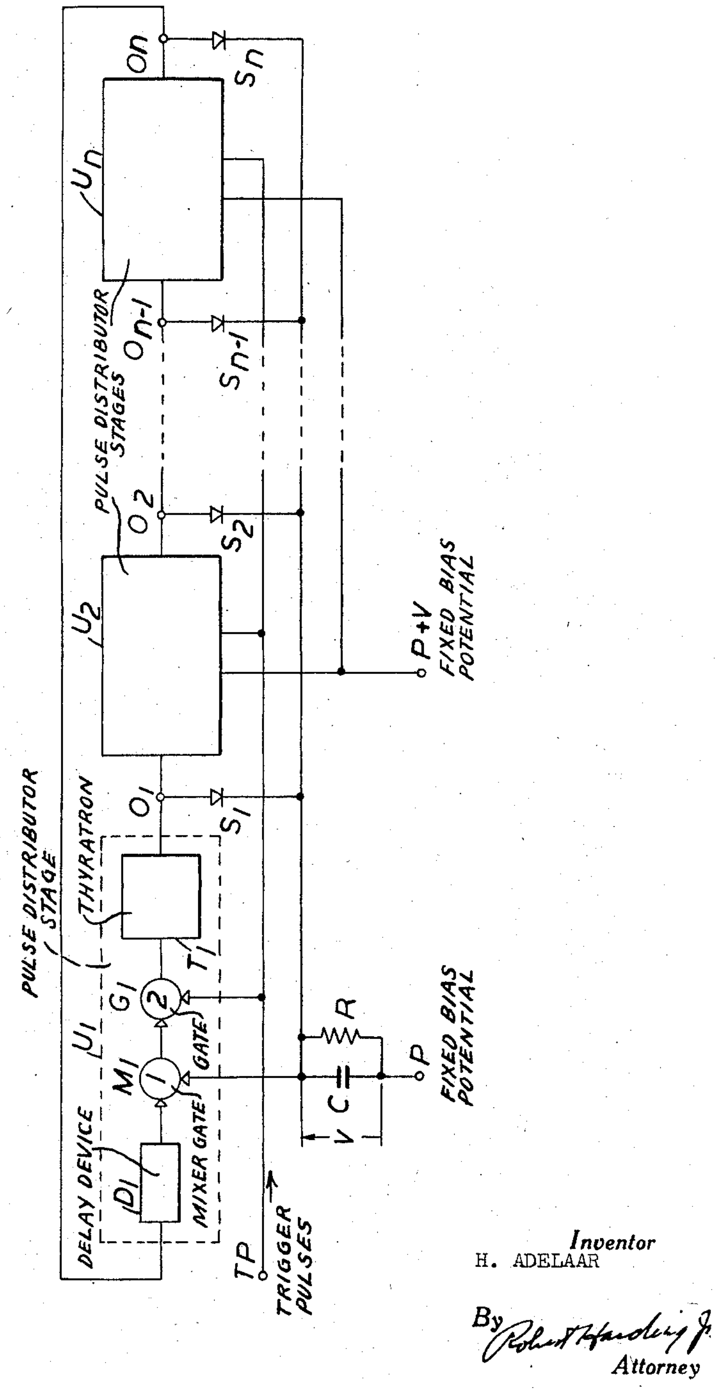
Inventor
H. ADELAAR
By Robert Harding Jr.
Attorney United States Patent Office 2,928,939

Patented Mar. 15, 1960

2,928,939

AUTOMATIC STARTING CIRCUIT FOR ELECTRICAL PULSE DISTRIBUTORS

Hans Helmut Adelaar, Antwerp, Belgium, assignor to International Standard Electric Corporation, New York, N.Y., a corporation of Delaware Application July 28, 1958, Serial No. 751,279

2 Claims. (Cl. 250—27)

The invention relates to automatic starting circuits for electrical pulse distributors or ring counters.

More particularly, it concerns electrical pulse distributors or ring counters such that at least one particular stage thereof is always the first to be automatically activated when input pulses are applied. The principle of such an automatic starting circuit is known from the Belgian Patent No. 512,366. Therein, it is disclosed to have one particular stage of a pulse distributor activated not under the control of a delayed signal coming from the previous stage when the latter is activated but under the control of signals indicating that other stages of the pulse distributor are simultaneously in the nonactive condition.

An object of the invention is to realize an automatic starting circuit for an electrical pulse distributor or ring counter in such a way that each stage including the starting stage(s) is controlled from the previous stage during the normal operation.

In accordance with the invention, an automatic starting circuit for electrical pulse distributors or ring counters fed from a source of input pulses in which at least one particular stage is initially and automatically caused to be activated, is characterised by a permanent D.C. signal causing said particular stage(s) to be activated by an input pulse, the enabling effect of said D.C. signal being cancelled as soon as the distributor becomes operative by an opposed rectified D.C. signal derived from outputs of the distributor stages, and preferably from all the stages.

The above and other objects and characteristics of the invention will be better understood from the following description of an embodiment to be read in conjunction with the accompanying drawing which schematically represents those parts of a pulse distributor useful to explain the invention.

Referring to the drawing, the pulse distributor comprises $n$ stages $U_{1/n}$ of which only the first, $U_1$ is represented in some detail since all the others are identical to the first, each stage being coupled to the next in ring counter fashion. As shown, the input of the first stage $U_1$ is connected to the output terminal $O_n$ of the last stage $U_n$ and this input terminal is connected to a delay device $D_1$ the output of which constitutes one of the inputs of the coincidence gate $G_1$ which it reaches through the mixer $M_1$. The other input of $G_1$ is connected, together with like inputs of the corresponding gates in the other stages, to terminal TP at which common input trigger pulses are applied. The other input of the mixer $M_1$ is biased to a fixed potential P through an automatic bias network consisting of condenser C shunted by resistor R. All the output terminals $O_{1/n}$ of the various stages are connected to the upper end of this parallel combination through an individual rectifier such as $S_1$ connected to output terminal $O_1$ of the first stage $U_1$.

This biassing to the fixed potential P is however used only for the first stage $U_1$, the remaining stages being biassed directly to a fixed potential $P+V$.

Potential P has such a value that it enables a first trigger pulse at terminal TP to flow through gate $G_1$ to activate the element $T_1$ of the first stage which may for instance consist in a thyratron with its associated circuitry and which will be ionized by the first trigger pulse appearing at terminal TP. On the other hand, this first trigger pulse at terminal TP will be unable to flow through the corresponding gates in the remaining stages as the potential $P+V$ is chosen so as not to allow this.

In this manner, the distributor is therefore started and due to the activation of element $T_1$, an output pulse will be produced at terminal $O_1$ which will reach the corresponding gate in stage $U_2$ after having been suitably delayed in that stage so that it will properly straddle the next trigger pulse which will therefore activate stage $U_2$ and more particularly its element $T_2$ (not shown) to produce an output pulse at terminal $O_2$. In order that this second pulse and also the further trigger pulses should not again directly activate stage $U_1$, which is returned, as well as the other stages, to normal condition some time before the appearance of the next trigger pulse by conventional means not shown, the first output pulse at terminal $O_1$ will feed a current through rectifier $S_1$ to charge the smoothing condenser C shunting resistor R so that the voltage across the latter reaches a value about equal to V. Thus, the potential at the lower input of the mixer $M_1$ will, already at the time the second trigger pulse is received, be of a value $P+V$ which does not allow the trigger pulse to flow through $G_1$ unless a delayed pulse from the previous stage appears at the other input of the mixer $M_1$. Further output pulses at the various output terminals will continue to maintain the voltage across resistor R substantially equal to V with the help of condenser C, and the automatic starting circuit for the first stage is therefore disabled as soon and as long as the distributor is in operation, the further output pulse to be produced at terminal $O_1$ resulting only from a pulse being produced at the preceding stage, i.e. $U_n$, in coincidence with a trigger pulse.

In the case of a thyratron constituting element $T_1$ and being associated with an output transformer, an output winding of the latter may have one end connected to terminal $O_1$ while its other end is biassed to the fixed potential P.

The above manner of securing an automatic start for the distributor is particularly advantageous since all stages can be controlled in like manner, there being only a difference in bias, using the parallel RC combination (for the first stage). Further, only a single decoupling rectifier is required for each stage since the mixer will not generally require additional components as each stage must include a condenser to couple the trigger pulses capacitively to each coincidence gate thereby taking care of differences in D.C. levels.

While the principles of the invention have been described above in connection with specific apparatus, it is to be clearly understood that this description is made only by way of example and not as a limitation on the scope of the invention.

What is claimed is:

1. Automatic starting circuit for electrical pulse distributors having a source of input pulses coupled to the stages of said distributor, and means for initially and automatically causing one stage to be activated, said last named means comprising a direct potential source coupled to said one stage and independent of said other stages to cause it to be activated in response to an input pulse from said source of input pulses and means to produce an opposed direct control potential in response to operation of said distributor from outputs of the distributor stages to cancel the effect of said direct current source.

2. Automatic starting circuit for electrical pulse distributors having a source of input pulses coupled to the stages of said distributor, and means for initially and automatically causing one stage to be activated, said last named means comprising a direct potential source coupled to said one stage to cause it to be activated in response to an input pulse from said source of input pulses, and means to produce an opposed direct control potential in response to operation of said distributor from outputs of the distributor stages to cancel the effect of said direct current source, said means for initially and automatically causing one stage to be activated comprising a parallel resistor-capacitor circuit, one end of said parallel circuit being connected to said potential source, means connecting the other end of said circuit to said one stage so that said potential enables said starting stage to be activated upon a first input pulse being applied to all the stages of the distributor, and said means to produce opposed control potential comprises a rectifier connected between the output of each stage and said other end of said parallel circuit, whereby the potential difference across said parallel circuit is such to prevent further activation of said starting stage unless an input pulse coincides with a delayed output pulse from the last stage of said distributor.

References Cited in the file of this patent

UNITED STATES PATENTS 2,402,372 Compton -------------- June 18, 1946